Patented Apr. 22, 1941

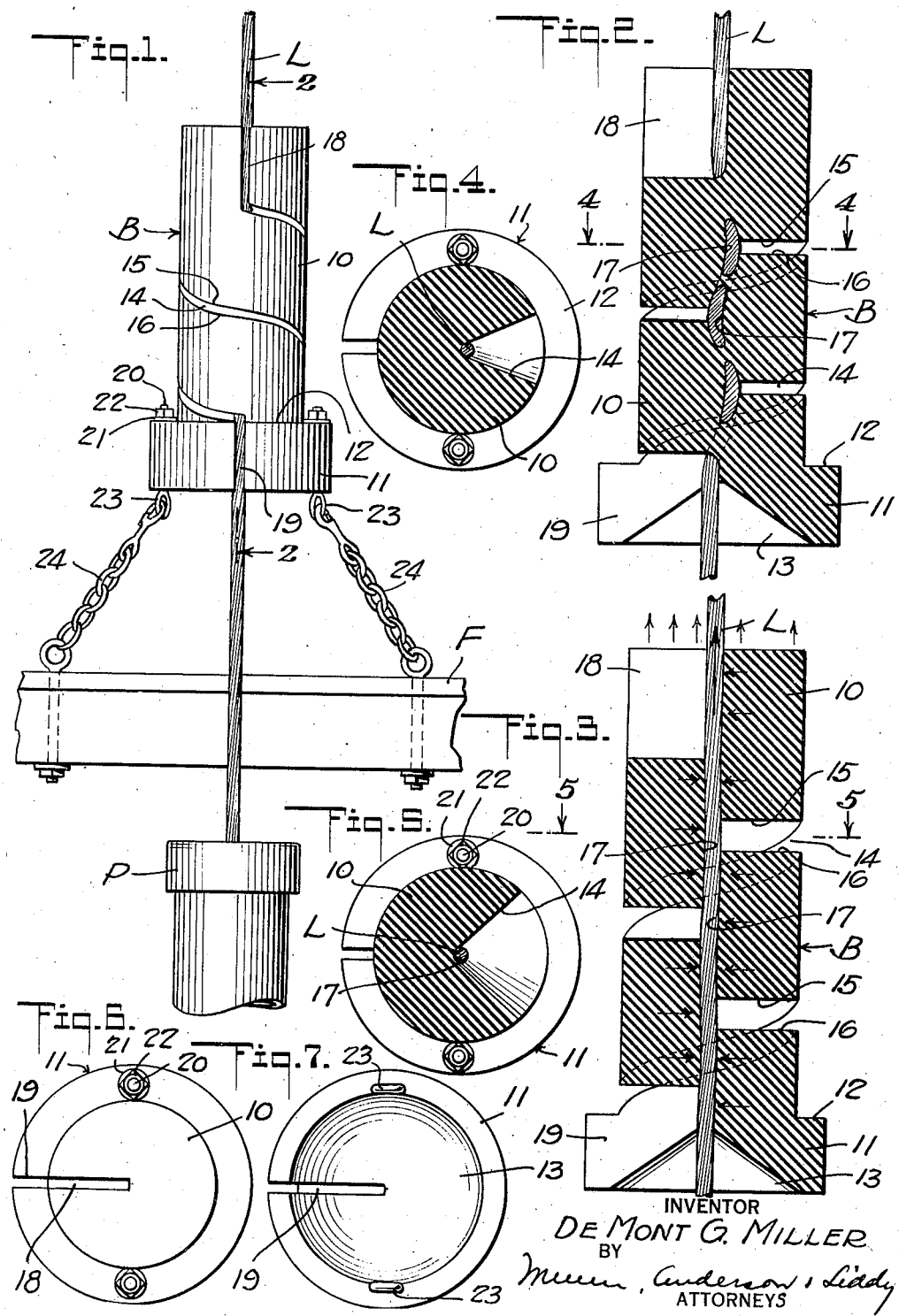

2,239,159

UNITED STATES PATENT OFFICE 2,239,159

LINE WIPING DEVICE

De Mont G. Miller, Los Angeles, Calif., assignor to Patterson-Ballagh Corporation, Los Angeles, Calif., a corporation of California Application February 14, 1940, Serial No. 318,846

7 Claims. (Cl. 15—210)

This invention relates generally to lines such as cables and ropes as used in industry, and more particularly to a device for removing foreign substances which accumulate on a line during its use.

An object of the invention is to provide a device which is structurally characterized by extremely simple means operable automatically during movement of a line therethrough to effectively clean the line of any foreign substances accumulating on the line during its use in liquids or under any conditions which cause foreign matter to adhere to the line, whereby handling and winding of the line will be facilitated and simplified, and the useful life of the line prolonged.

Another object of the invention is to provide a device which, in one of its many adaptations, is particularly useful to the oil industry to thoroughly wipe the sand line or other line which is lowered into a well hole, all to the end of preventing oil and/or mud which adheres to the line from being blown onto surrounding property or spattered about the derrick floor with the attendant danger to the operators of slipping on the floor and being injured.

A further object of the invention is to provide a line wiping device of the above described character which is extremely simple in construction; can be inexpensively manufactured; is easy to install and entirely automatic in operation, and will function to thoroughly clean a large amount of line before the efficiency of the line is seriously impaired, thus enabling the device to be used at negligible cost.

With these and other objects in view, the invention resides in the combinations and arrangements of elements as set forth in the following specification and particularly pointed out in the appended claims.

In the accompanying drawing,

Figure 1 is a view in side elevation of the invention applied to the sand line of a drilling rig;

Figure 2 is an enlarged vertical longitudinal sectional view of the invention;

Figure 3 is a view similar to Figure 2 with a line being pulled through the device;

Figures 4 and 5 are transverse sectional views taken, respectively, on the lines 4—4 and 5—5 of Figures 2 and 3, respectively;

Figures 6 and 7 are views in elevation of the opposite ends of the device.

Referring specifically to the drawing, the invention in its illustrated embodiment comprises a body B of flexible or resilient material, which in practice can be a high grade of elastic rubber of high tensile strength, or "Neoprene" or other elastic plastic.

The body is in the form of a solid cylinder 10 having a cylindrical head 11 at one end providing a transverse shoulder 12 and being conically recessed at its outer end to provide a cavity 13.

The body is provided with a line receiving slot or passage 14 which extends helically in the body and defines opposed convoluted side walls 15 and 16 and a bottom wall 17, the passage opening to the ends of the body by means of axial extensions 18 and 19 in the head 11 and in the other end of the body 10. The passage 14 is of a depth in a direction radially of the body for the passage to terminate substantially at the axis of the body or the helix formed therein by the passage, so that as the device is manufactured, no continuous rectilinear opening will extend axially through the body.

Suitable attaching means such as bolts 20 extend axially through the head 11 at diametrically opposed points and are provided with washers 21 and nuts 22 to secure the bolts to the body with eyes 23 on the bolts projecting from the end of the body.

Chains or ropes 24 are attached to the eyes 23 and secured to the derrick floor F or other convenient support as close to the exit pipe P or rotary table as possible in order to anchor the body and to prevent free rotation thereof with the possibility that the attaching chains might twist upon the line being wiped, and break the line.

With the device installed as shown in Figure 1, the line L, which may be the sand line or other line run into the hole, is applied to the body B by manipulating the latter around the line until the line extends through the passage 14 from one end of the body to the other.

When a pull is exerted upwardly on the line, that portion of the line between the ends of the helical passage 14 will endeavor to form a straight stretch, but will be prevented from so doing by the fact that no continuous rectilinear hole exists in the body axially of the helical passage. Thus the line exerts a force radially inward of the body upon the bottom wall 17 of the passage to radially expand and elongate the body as illustrated in Figure 3.

Due to the resiliency or elasticity of the body, the walls of the passage 14 will exert a frictional grip or constricting force upon the line so as to effectively wipe from the line, any foreign substances such as oil or mud which adhere to the line as it is pulled from the hole.

The wiping action of the body upon the line will continue until the bottom wall 17 has been worn away to an extent sufficient to create an axial hole through the body of a diameter to freely pass the line L, and it has been found in practice that cable in an amount exceeding one hundred miles can be passed through the body without rendering the body unfit for use in effectively wiping mud or oil from the line.

The foreign substances wiped from the line are confined to a relatively small area around the line by the action of the cavity 13 in preventing spattering of the substances, which latter also drain down the body from the passage 14. It has also been found in practice that a passage extending a distance of two revolutions in the body effects maximum cleaning of the line consistent with minimum resistance to movement of the line and wear upon the body.

The recess 13 also functions to guide any enlargement such as a rope socket on the bottom end of the line, into the lower end of the passage 14 so that such enlargement will spread the walls of the passage to automatically cause the body to open and fly off the line.

What is claimed is:

1. A device of the class described comprising: a convoluted body of relatively soft resilient material defining a helical line receiving passage; said passage having end portions extending generally axially to opposite ends of the body, with the depth of the passage in a direction radially of the body being substantially to the axis of the helix.

2. A device of the class described comprising: a body of relatively soft resilient material having opposed convoluted walls normally urged towards each other by the resiliency of the body and defining a continuous helical passage through which a line can be pulled said passage extending in sufficiently close proximity to the axis of the helix for wiping of foreign substances from the line by a constricting action of the walls upon the line.

3. A device of the class described comprising: a body of relatively soft resilient material having opposed convoluted walls defining a helical passage between which a line can be pulled from one end of the body to the other; one end of the body having a relatively large cavity opening to one end of the passage by which foreign substances wiped from the line will be confined against spattering.

4. A device of the class described comprising: an integral body of yieldable material adapted to be anchored against rotation about its longitudinal axis and against a pulling force axially thereof; the body being convoluted to define a helical line receiving passage opening to opposite ends of the body and extending from the periphery of the latter to a point sufficiently close to the axis of the helix for a line pulled through the passage, to be wiped by a constricting action of the walls of the passage upon the line.

5. A device of the class described comprising: a body of resilient material having convoluted walls normally urged towards each other by the resiliency of the body and defining a continuous helical passage through which a line can be pulled; and means by which the body is adapted to be anchored against rotation about the axis of the passage; said passage extending from the periphery of the body and terminating in such proximity to the axis of the helix that the tendency of a line when pulled taut in the passage will be to expand the body radially, whereby the body will exert a constricting force upon the line so as to wipe the latter.

6. A device of the class described comprising: a body of resilient material having convoluted walls normally urged towards each other by the resiliency of the body and defining a continuous helical passage through which a line can be pulled; and means by which the body is adapted to be anchored against rotation about the axis of the passage; said passage extending from the periphery of the body and terminating in such proximity to the axis of the helix that the tendency of a line when pulled taut in the passage will be to expand the body radially, whereby the body will exert a constricting force upon the line so as to wipe the latter, the body having a cavity in one end into which an end of said passage opens, for confining against spattering foreign substances wiped from the line.

7. A device of the class described comprising: a body of resilient material having convoluted walls normally urged towards each other by the resiliency of the body and defining a continuous helical passage through which a line can be pulled; and means by which the body is adapted to be anchored against rotation about the axis of the passage; said passage extending from the periphery of the body and terminating in such proximity to the axis of the helix that the tendency of a line when pulled taut in the passage will be to expand the body radially, whereby the body will exert a constricting force upon the line so as to wipe the latter, the body having a cavity in one end into which an end of said passage opens, with the walls of said cavity converging towards said end of the passage so as to guide into the latter, an enlargement on the line for the purpose described.

DE MONT G. MILLER.